(12) United States Patent
Hanson

(10) Patent No.: US 8,337,985 B2
(45) Date of Patent: *Dec. 25, 2012

(54) COATED SUBSTRATES, ORGANOMETALLIC FILMS AND METHODS FOR APPLYING ORGANOMETALLIC FILMS TO SUBSTRATES

(75) Inventor: Eric L. Hanson, San Diego, CA (US)

(73) Assignee: Aculon, Inc., San Diego, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 12/928,585

(22) Filed: Dec. 15, 2010

(65) Prior Publication Data

US 2011/0091729 A1    Apr. 21, 2011

Related U.S. Application Data

(63) Continuation of application No. 12/799,423, filed on Apr. 23, 2010, now Pat. No. 7,901,777, which is a continuation of application No. 11/985,151, filed on Nov. 14, 2007, now Pat. No. 7,740,940.

(60) Provisional application No. 60/859,194, filed on Nov. 15, 2006.

(51) Int. Cl.
B32B 7/10 (2006.01)
B32B 18/00 (2006.01)
B32B 27/30 (2006.01)
B32B 27/36 (2006.01)
B32B 27/40 (2006.01)

(52) U.S. Cl. ........... 428/412; 428/413; 428/423.1; 428/425.9; 428/447; 428/480; 428/522; 428/688; 428/689; 428/697; 428/702; 428/704

(58) Field of Classification Search ............... None
See application file for complete search history.

(56) References Cited

U.S. PATENT DOCUMENTS

| | | | |
|---|---|---|---|
| 2,984,641 A | 5/1961 | Wolinski | 260/41 |
| 4,272,588 A | 6/1981 | Yoldas et al. | 428/433 |
| 4,830,879 A | 5/1989 | Debsikdar | 427/162 |
| 5,149,596 A | 9/1992 | Smith et al. | 428/656 |
| 5,352,485 A | 10/1994 | DeGuire et al. | 427/226 |
| 5,545,432 A | 8/1996 | DeGuire et al. | 427/226 |
| 5,638,479 A | 6/1997 | Takami et al. | 385/124 |
| 5,854,341 A | 12/1998 | Yamamoto et al. | 524/767 |
| 5,879,757 A | 3/1999 | Gutowski et al. | 427/491 |
| 6,103,854 A | 8/2000 | Arakawa et al. | 528/196 |
| 6,146,767 A | 11/2000 | Schwartz | 428/457 |
| 6,207,236 B1 | 3/2001 | Araki et al. | 427/386 |
| 6,228,796 B1 | 5/2001 | Arakawa et al. | 502/159 |
| 6,395,341 B1 | 5/2002 | Arakawa et al. | 427/419.1 |
| 6,645,644 B1 | 11/2003 | Schwartz et al. | 428/632 |
| 6,692,833 B2 | 2/2004 | Zagdoun | 428/433 |
| 6,737,145 B1 | 5/2004 | Watanabe et al. | 428/64.4 |
| 6,946,519 B2 | 9/2005 | Okubo et al. | 525/54.3 |
| 6,965,001 B2 | 11/2005 | Arakawa et al. | 525/474 |
| 7,067,169 B2 | 6/2006 | Liu et al. | 427/2.13 |
| 7,341,756 B2 | 3/2008 | Liu et al. | 427/2.13 |
| 7,740,940 B2* | 6/2010 | Hanson | 428/412 |
| 7,901,777 B2* | 3/2011 | Hanson | 428/412 |
| 7,989,069 B2* | 8/2011 | Bruner et al. | 428/412 |
| 8,048,487 B2* | 11/2011 | Hanson | 427/383.1 |
| 2003/0130127 A1 | 7/2003 | Hentges et al. | 505/100 |
| 2004/0023048 A1 | 2/2004 | Schwartz et al. | 428/472.1 |
| 2007/0092640 A1 | 4/2007 | Bruner et al. | 427/157 |
| 2007/0092735 A1 | 4/2007 | Bruner et al. | 428/432 |
| 2008/0131701 A1 | 6/2008 | Hanson | 428/412 |
| 2012/0003481 A1* | 1/2012 | Hanson | 428/412 |
| 2012/0004388 A1* | 1/2012 | Hanson | 528/395 |

FOREIGN PATENT DOCUMENTS

| | | | |
|---|---|---|---|
| EP | 1 559 810 A2 | | 8/2005 |
| GB | 2 208 874 A | | 4/1989 |
| JP | 4-180942 | | 6/1992 |
| JP | 10-230560 | | 9/1998 |
| JP | 2001-018319 | * | 1/2001 |
| JP | 2001-066581 | | 3/2001 |
| JP | 2003-326634 | * | 11/2003 |

* cited by examiner

Primary Examiner — Vivian Chen
(74) Attorney, Agent, or Firm — William J. Uhl

(57) ABSTRACT

A coated article comprising a substrate having a plastic surface and adhered thereto an organometallic film in which the metal has f electron orbitals or is niobium is disclosed. Also disclosed are methods for applying organometallic films to substrates and the organometallic films themselves.

5 Claims, No Drawings

COATED SUBSTRATES, ORGANOMETALLIC FILMS AND METHODS FOR APPLYING ORGANOMETALLIC FILMS TO SUBSTRATES

CROSS REFERENCE TO RELATED APPLICATION

The present application is a continuation of U.S. patent application Ser. No. 12/799,423, filed Apr. 23, 2010, now U.S. Pat. No. 7,901,777, which is a continuation of U.S. patent application Ser. No. 11/985,151, filed Nov. 14, 2007, now U.S. Pat. No. 7,740,940, which claims priority from U.S. Provisional Patent Application Ser. No. 60/859,194, filed Nov. 15, 2006.

FIELD OF THE INVENTION

The present invention relates to polymer substrates coated with an organometallic film, to organometallic films and to methods for applying organometallic films to substrates.

BACKGROUND OF THE INVENTION

Self-assembled films or layers on various substrates are well known in the art. These films or layers typically have functional groups (head groups) that bond to a cofunctional group on the substrate surface and organo groups that have some mutual attraction to neighboring molecules in the layer(s) or to the surface. The self-assembled films are used in various applications such as for medical and electrical use. In medical applications, the self-assembled films are used to form an interfacial layer between a titanium orthopedic implant and the surrounding body tissue. For electrical applications, the self-assembled films are useful for improving the performance of devices that incorporate organic-inorganic interfaces such as those found in organic light-emitting diodes. An example of a self-assembled organic layer is disclosed in U.S. Pat. No. 6,645,644 in which an organometallic compound such as a titanium or zirconium metal alkoxide is applied to a substrate such as a metal having a native oxide surface. The alkoxide groups react with the oxide groups forming a secure surface bond. The free or unreacted alkoxide groups are available for reaction with reactive groups such as acid groups in a subsequently applied layer.

Unfortunately, such organometallic coatings often have poor durability and are easily removed from many substrates, particularly polymer substrates such as polycarbonates and polysiloxanes.

It would be desirable to provide an organometallic coating derived from a transition metal alkoxide that has better durability and adhesion to various substrates, particularly polymer substrates.

SUMMARY OF THE INVENTION

The present invention provides a coated article comprising:
(a) a polymer substrate and adhered to the substrate surface
(b) an organometallic film in which the metal has electrons in the f orbital or is niobium.

The organometallic film adheres well to various surfaces including polymer surfaces and also adheres well to subsequently applied coatings such as hydrophobic coatings.

The organometallic film can act as an anchor for functional coatings (e.g. hydrophobic, antifog, antistatic, conductive, etc.), or as an adhesion promoter at organic/organic, organic/inorganic interfaces (e.g. as an adhesion promoter at a polyimide/polyester interface).

The present invention also provides a method for depositing an organometallic coating or film to a substrate comprising:
(a) contacting the surface of the substrate with a metal alkoxide in which the metal has electrons in the f orbital or is niobium so as to deposit a film on the surface,
(b) exposing the film to conditions sufficient to form a polymeric metal oxide with alkoxide and hydroxyl groups.

The present invention also provides for organometallic films comprising polymer metal oxides with alkoxide and hydroxyl groups and in which the metal has electrons in the f orbital or is niobium.

DETAILED DESCRIPTION

Examples of substrates are those which have groups on their surface that are reactive with functional groups associated with the organometallic coating. Examples of such groups are oxide and/or hydroxyl groups. Examples of other groups are carbonyl, carbonate and amide. Non-limiting examples of such substrates are those which inherently have such groups on their surface or which form such groups by subsequent treatment such as exposure to the environment or a plasma treatment. Examples of materials which form metal oxide surfaces upon exposure to ambient conditions include steels, including stainless steels, iron, and metals which acquire a non-ablating oxide coating upon exposure to the ambient environment, for example, tantalum, titanium, titanium alloys, aluminum, and aluminum alloys. Additional examples of materials that acquire an oxide layer upon exposure to the ambient conditions are ceramic materials, for example, silicon nitride. Also suitable in the method of the present invention are materials which have an oxide coating imparted to them, for example, thick film oxide insulators in semiconducting devices, and those which can be derivatized to have an oxide surface, for example, gallium arsenide, gallium nitride, and silicon carbide. Other examples include conducting oxides, such as indium tin oxide, deposited on a glass substrate. Also, metal oxides can be deposited on polymer substrates, for example, "stacked" metal oxides on polymer substrates to provide anti-reflective properties. Examples of polymer substrates are those that contain OH or oxide groups, such as acrylic copolymers made from one or more monomers that contain hydroxyl groups. Also, composite inorganic/organic polymers such as organo polymers containing entrained silica and/or alumina may be used. Surprisingly, it has been found that certain polymers that do not adhere well to organometallic coatings such as the titanium and zirconium organometallic coatings in the aforementioned U.S. Pat. No. 6,645,644 adhere very well to the organometallic coatings of the present invention. Examples of such polymers are polycarbonates including aromatic and aliphatic polycarbonates, polyurethanes, polyesters, polyepoxides, acrylic polymers and copolymers (without hydroxyl groups) and polysiloxanes. The polymer can be in the form of a polymer substrate or a polymer coating on a different substrate, for example, a metal or metal oxide with a polymer surface coating, and a polycarbonate substrate such as an ophthalmic lens with a polysiloxane hard coat on its surface.

Preferably, the polymer surface is oxidized such as by subjecting the polymer to an atmospheric plasma treatment in the presence of air before application of the organometallic coating.

The organometallic film or coating that is applied to the substrate is derived from an organo metal in which the metal has electrons in the f electron orbital such as metals selected from Period 6 of the Periodic Table of elements (lanthanide series). Examples of suitable metals include La, Hf, Ta, and W, with Ta being preferred. An example of another suitable metal is niobium. The organo portion of the metal is preferably an alkoxide containing from 1 to 18, preferably 2 to 8 carbon atoms such as ethoxide, propoxide, isopropoxide, butoxide, isobutoxide and tertiary butoxide. The alkoxides may be in the form of simple esters and polymeric forms of the esters. For example, with the preferred metal Ta, the simple esters would be $Ta(OR)_5$ where R is $C_1$ to $C_{18}$ alkyl. Polymeric esters would be obtained by condensation of the alkyl esters mentioned above and typically would have the structure RO—$[Ta(OR)_3$—O—$]_x$R where R is defined above and x is a positive integer. Besides alkoxides, other ligands can be present such as acetyl acetonates. Also, ligands such as chloride, acetylacetonate, alkanolamine and lactate, etc. may be present.

The organometallic compound may be used neat and applied under vacuum, by chemical vapor deposition techniques, or it may be dissolved or dispersed in a diluent and applied by coating techniques described below. Examples of suitable diluents are alcohols such as methanol, ethanol and propanol, aliphatic hydrocarbons, such as hexane, isooctane and decane, ethers, for example, tetrahydrofuran and dialkylethers such as diethylether.

Also, adjuvant materials may be present in the organometallic composition. Examples include stabilizers such as sterically hindered alcohols and acids, surfactants and anti-static agents. The adjuvants if present are present in amounts of up to 30 percent by weight based on the non-volatile content of the composition.

The concentration of the organometallic compound in the composition is not particularly critical but is usually at least 0.01 millimolar, typically from 0.01 to 100 millimolar, and more typically from 0.1 to 50 millimolar.

The organometallic treating composition can be obtained by mixing all of the components at the same time with low shear mixing or by combining the ingredients in several steps. The organometallic compounds are reactive with moisture, and care should be taken that moisture is not introduced with the diluent or adjuvant materials and that mixing is conducted in a substantially anhydrous atmosphere.

The organometallic composition can be applied to the substrate surface by conventional means such as immersion coating such as dipping, rolling, spraying or wiping to form a film. The diluent is permitted to evaporate. This can be accomplished by heating to 50-200° C. or by simple exposure to ambient temperature, that is, from 20-25° C. It is believed that the resulting film is in the form of a polymeric metal oxide in multilayer form with unreacted alkoxide and hydroxyl groups. This is accomplished by depositing the film under conditions resulting in hydrolysis and self-condensation of the alkoxide. These reactions result in a polymeric coating being formed that provides cohesive strength to the film. The conditions necessary for these reactions to occur is to deposit the film in the presence of water, such as a moisture-containing atmosphere. The resulting film has some unreacted alkoxide groups and/or hydroxyl groups for subsequent reaction and possible covalent bonding with an overlayer material.

However, for readily co-reactive groups, ambient temperatures, that is, 20° C., may be sufficient. Although not intending to be bound by any theory, it is believed the polymeric metal oxide is of the structure:

where M is the metal of the invention, R is an alkyl group containing from 1 to 30 carbon atoms; x+y+z=V, the valence of M; x is at least 1, y is at least 1, z is at least 1; x=V−y−z; y=V−x−z; z=V−x−y; n is greater than 2, such as 2 to 1000.

For optical applications, the resulting film typically has a thickness of 5 to 100 nanometers. For other applications, thicker films can be used. When the organometallic compound is used neat and applied by chemical vapor deposition techniques in the absence of moisture, a thin metal alkoxide film is believed to form. Polymerization, if any occurs, is minimized and the film may be in monolayer configuration. When the organometallic compound is subjected to hydrolysis and self-condensation conditions as mentioned above, thicker films are formed.

The process of the present invention can be used to provide a film or layer that is continuous or discontinuous, that is, in a pattern on the substrate surface. Non-limiting examples include spraying the composition onto the surface of the substrate in pre-determined areas, for example, by ink-jet printing or stenciling. Other methods may be found by adapting printing techniques, including stamping, lithographing and gravure printing a coating solution onto the substrate in a pattern.

As mentioned above, an overlayer or a different film can be applied to the organometallic film. Such an overlayer material preferably contains groups that are reactive with the alkoxide and/or hydroxyl groups, such as hydroxyl groups or acid groups or derivatives thereof.

Preferably, the overlayer is an organic acid or a derivative thereof. The acid may be a carboxylic acid, a sulfonic acid or a phosphorus acid, such as a phosphoric acid, phosphonic acid or a phosphinic acid. By derivatives of acids are meant functional groups that perform similarly as acids such as acid salts, acid esters and acid complexes. The organo group of the acid may be monomeric, oligomeric or polymeric. For example, the organo acid may be a monomeric, phosphoric, phosphonic or phosphinic acid.

Examples of monomeric phosphoric acids are compounds or a mixture of compounds having the following structure:

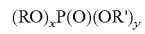

wherein x is 1-2, y is 1-2 and x+y=3, R' is a radical having a total of 1-30, preferably 6-18 carbons, where R' is H, a metal such as an alkali metal, for example, sodium or potassium, alkyl including substituted alkyl having 1 to 50 carbons, preferably 1 to 4 carbons such as methyl or ethyl, including substituted aryl having 6 to 50 carbons; preferably, a portion of R' is H. The organic component of the phosphoric acid (R) can be aliphatic (e.g., alkyl having 2-20, preferably 6-18 carbon atoms) including an unsaturated carbon chain (e.g., an olefin), or can be aryl or aryl-substituted moiety.

Example of monomeric phosphonic acids are compounds or mixture of compounds having the formula:

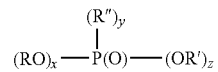

wherein x is 0-1, y is 1, z is 1-2 and x+y+z is 3. Preferably, R and R" are each independently a radical having a total of 1-30, preferably 6-18 carbons. R' is H, a metal, such as an alkali metal, for example, sodium or potassium or an amine or alkyl including substituted alkyl having 1 to 50 carbon atoms, preferably lower alkyl having 1-4 carbons such as methyl or ethyl, or aryl including substituted aryl having 6 to 50 carbons. Preferably at least a portion of R' is H. The organic component of the phosphonic acid (R and R") can be aliphatic (e.g., alkyl having 2-20, preferably 6-18 carbon atoms) including an unsaturated carbon chain (e.g., an olefin), or can be an aryl or aryl-substituted moiety.

Example of monomeric phosphinic acids are compounds or mixture of compounds having the formula:

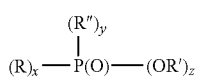

wherein x is 0-2, y is 0-2, z is 1 and x+y+z is 3. Preferably, R and R" are each independently radicals having a total of 1-30, preferably 6-18 carbons. R' is H, a metal, such as an alkali metal, for example, sodium or potassium or an amine or alkyl including substituted alkyl having 1 to 50 carbon atoms, preferably lower alkyl having 1-4 carbons, such as methyl or ethyl, or aryl including substituted aryl having 6 to 50 carbons. Preferably a portion of R' is H. The organic component of the phosphinic acid (R, R") can be aliphatic (e.g., alkyl having 2-20, preferably 6-18 carbon atoms) including an unsaturated carbon chain (e.g., an olefin), or can be an aryl or aryl-substituted moiety.

Examples of organo groups which may comprise R and R" include long and short chain aliphatic hydrocarbons, aromatic hydrocarbons and substituted aliphatic hydrocarbons and substituted aromatic hydrocarbons. Examples of substituents include carboxyl such as carboxylic acid, hydroxyl, amino, imino, amido, thio, cyano, and fluoro.

Representative of the organophosphorous acids are as follows: amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, dodecyl bis-1,12-phosphonic acid, poly (hexafluoropropyl)phosphonic acid.

In addition to the monomeric organophosphorous acids, oligomeric or polymeric organophosphorous acids resulting from self-condensation of the respective monomeric acids may be used.

To provide hydrophobic properties to the overlayer, the organic acid or derivative thereof is preferably a fluorinated material, typically a perfluorinated oligomer having a number average molecular weight of less than 2000. The perfluorinated material can be a perfluorinated hydrocarbon of the following structure:

where $R_f$ is a perfluorinated alkyl group or a perfluorinated alkylene ether group and p is 2 to 4, preferably 2.

Examples of perfluoroalkyl groups are those of the structure:

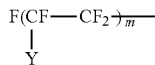

where Y is F or $C_nF_{2n+1}$; m is 4 to 20 and n is 1 to 6.

Examples of perfluoroalkylene ether groups are those of the structure:

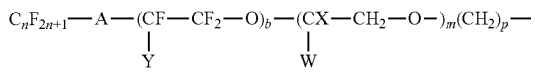

where A is an oxygen radical or a chemical bond; n is 1 to 6; Y is F or $C_nF_{2n+1}$; W is H, F, $C_nH_{2n}$ or $C_nF_{2n}$; b is 2 to 10, m is 0 to 6, and p is 0 to 18.

X is an acid group or an acid derivative. Preferably, X is:

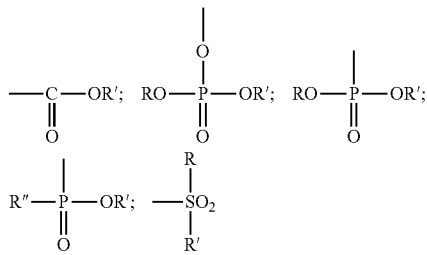

where R and R" are a hydrocarbon or substituted hydrocarbon radical having up to 200, such as 1 to 30 and 6 to 20 carbons, R can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

Examples of fluorinated materials are esters of perfluorinated alcohols such as the alcohols of the structure:

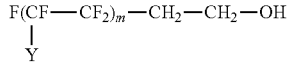

where Y is F or $C_nF_{2n+1}$; m is 4 to 20 and n is 1 to 6.

Examples of suitable esters are stearates and citrates of such alcohols. Such materials are available from E. I. du Pont de Nemours and Company under the trademark ZONYL FTS and ZONYL TBC.

For application to the surface of the substrate, the overlayer material is dissolved in a liquid diluent. The concentration of the overlayer material is typically dilute, for example, no greater than 10 percent on a weight/volume basis for solid overlayer material and 10 percent on a volume/volume basis for oil and liquid overlayer material, and preferably is within the range of 0.01 to 1.0 percent. The percentages are based on total weight or volume of the solution.

Examples of suitable diluents are hydrocarbons such as hexane isooctane and toluene; ketones such as methyl ethyl ketone; alcohols such as methanol and ethanol; ethers such as tetrahydrofuran. Fluorinated solvents such as nonafluorobutylmethyl ether and fluorinated solvents available as HFE-7100, supplied by 3M Innovative Products and perfluorinated ethers supplied by Solvay Solexis under the trademark GALDEN are preferred for use with the fluorinated material. The fluorinated solvents can be used in admixtures with the other solvents mentioned above. The fluorinated solvents or diluents are different from the fluorinated materials in that the fluorinated solvents or diluents are not film formers, whereas the fluorinated materials are. Preferably, the vapor pressure of the diluent is high, permitting rapid evaporation at room temperature (20-25° C.). The overlayer material can be dissolved easily upon adding the overlayer material to the diluent.

The solution of the overlayer material can be applied to the surface of the optical article by dipping, rolling, spraying or wiping. After application of the overlayer material, the diluent is permitted to evaporate, with or without wiping during evaporation, preferably at ambient temperature, or optionally by the application of heat.

The resultant layer typically is thin, having a thickness of about 10-100 nanometers or less. The fluorinated overlayers are hydrophobic, having a water contact angle greater than 70°, typically from 75-130°. The water contact angle can be determined using a contact angle goniometer such as a TANTEC contact angle meter Model CAM-MICRO.

EXAMPLES

The following examples show various coated articles and methods for their preparation in accordance with the invention. All parts are by weight unless otherwise indicated.

Example 1

One milliliter of a 0.25% solution of tantalum isopropoxide in isopropanol was dispensed onto a tissue ("Kimwipe" manufactured by Kimberly Clark) and rubbed on a polycarbonate lens which had a polysiloxane-based hardcoat for five seconds. Then, one milliliter of a 0.2% solution of poly(hexafluoropropyleneoxide)-monophosphonic acid p(HFPO)PA in 5% HFE-7100 (3M Innovative Products), 94% Soltrol-10 (CP Chem) and 1% orange oil fragrance (Citrus and Allied) was sprayed onto the tantalum alkoxide-coated lens surface. Over a period of 30 seconds, the solvent layer began to repel from the lens surface as the fluoropolymer coating reacted with the tantalum alkoxide. Any visibly remaining coating or solvent was then gently wiped from the surface using a microfiber cloth (Hilco Optiwipe). Water contact angle (WCA) measurements were taken initially, and after abrading the surface with a microfiber cloth (Hilco Optiwipe) at 150 g/cm$^2$ (Table 1).

To show that the organotantalum coating was still active after abrasion, the p(HFPO)PA coating was reapplied and the WCA increased back to the initial level (Table 1).

Example 2 (Comparative)

One milliliter of a 0.25% solution of aluminum isopropoxide in isopropanol was dispensed onto a tissue ("Kimwipe" manufactured by Kimberly Clark) and rubbed on a polycarbonate lens which had a polysiloxane-based hardcoat for five seconds. Then, one milliliter of a 0.2% solution of poly(hexafluoropropyleneoxide)-monophosphonic acid in 5% HFE-7100 (3M Innovative Products), 94% ethanol (Univar) and 1% orange oil fragrance (Citrus and Allied) was sprayed onto the aluminum alkoxide-coated lens surface. Over a period of 30 seconds, the solvent layer began to repel from the lens surface as the fluoropolymer coating reacted with the aluminum alkoxide layer. Any visibly remaining coating or solvent was then gently wiped from the surface using a microfiber cloth (Hilco Optiwipe). Water contact angle measurements were taken initially, and after abrading the surface with a microfiber cloth (Hilco Optiwipe) at 150 g/cm$^2$ (Table 1).

To show that the organoaluminum coating was inactive after abrasion, the p(HFPO)PA coating was reapplied and the WCA did not increase (Table 1).

Example 3 (Comparative)

One milliliter of a 0.25% solution of zirconium propoxide in isopropanol was dispensed onto a tissue ("Kimwipe" manufactured by Kimberly Clark) and rubbed on a polycarbonate lens which had a polysiloxane-based hardcoat for five seconds. Then, one milliliter of a 0.2% solution of poly(hexafluoropropyleneoxide)-monophosphonic acid in 5% HFE-7100 (3M Innovative Products), 94% ethanol (Univar) and 1% orange oil fragrance (Citrus and Allied) was sprayed onto the zirconium alkoxide-coated lens surface. Over a period of 30 seconds, the solvent layer began to repel from the lens surface as the fluoropolymer coating reacted with the zirconium alkoxide layer. Any visibly remaining coating or solvent was then gently wiped from the surface using a microfiber cloth (Hilco Optiwipe). Water contact angle measurements were taken initially, and after abrading the surface with a microfiber cloth (Hilco Optiwipe) at 150 g/cm$^2$ (Table 1).

To show that the organozirconium coating was inactive after abrasion, the p(HFPO)PA coating was reapplied and the WCA did not increase (Table 1).

Example 4 (Comparative)

One milliliter of a 0.5% solution of titanium n-butoxide in isopropanol was dispensed onto a tissue ("Kimwipe" manufactured by Kimberly Clark) and rubbed on a polycarbonate lens which had a polysiloxane-based hardcoat for five seconds. Then, one milliliter of a 0.2% solution of poly(hexafluoropropyleneoxide)-monophosphonic acid in 5% HFE-7100 (3M Innovative Products), 94% ethanol (Univar) and 1% orange oil fragrance (Citrus and Allied) was sprayed onto the titanium alkoxide-coated lens surface. Over a period of 30 seconds, the solvent layer began to repel from the lens surface as the fluoropolymer coating reacted with the titanium alkoxide layer. Any visibly remaining coating or solvent was then gently wiped from the surface using a microfiber cloth (Hilco Optiwipe). Water contact angle measurements were taken initially, and after abrading the surface with a microfiber cloth (Hilco Optiwipe) at 150 g/cm$^2$ (Table 1).

To show that the organotitanium coating was inactive after abrasion, the p(HFPO)PA coating was reapplied and the WCA did not increase (Table 1).

Example 5 (Comparative)

In this example, no organometallic coating step was employed. One milliliter of a 0.2% solution of poly(hexafluoropropyleneoxide)-monophosphonic acid in 5% HFE-7100 (3M Innovative Products), 94% ethanol (Univar) and 1% orange oil fragrance (Citrus and Allied) was sprayed onto a polycarbonate lens which had a polysiloxane-based hardcoat. The solvent was allowed to evaporate (30 seconds), and any visibly remaining coating or solvent was then gently wiped from the surface using a microfiber cloth (Hilco Optiwipe). Water contact angle measurements were taken initially, and after abrading the surface with a microfiber cloth (Hilco Optiwipe) at 150 g/cm$^2$ (Table 1).

TABLE 1

| | | | Abrasion Testing[2] | | | | | |
|---|---|---|---|---|---|---|---|---|
| Example | Coating | Initial WCA[1] | 10 cycles | 30 cycles | 50 cycles | 100 cycles | 250 cycles | Reapply |
| 1 | p(HFPO)PA | 110 | 109 | 106 | 104 | 102 | 100 | 110 |
| 2 | p(HFPO)PA | 107 | 105 | 97 | 90 | N/A | N/A | 87 |
| 3 | p(HFPO)PA | 112 | 106 | 97 | 90 | N/A | N/A | 85 |
| 4 | p(HFPO)PA | 113 | 110 | 100 | 90 | N/A | N/A | 85 |
| 5 | p(HFPO)PA | 85 | N/A | N/A | N/A | N/A | N/A | N/A |

[1]Water contact angle determined using a contact angle Goniometer TANTEC Contact Angle Meter, Model CAM-MICRO.
[2]Abrasion testing was done by rubbing back and forth (1 cycle) with a microfiber cloth at a pressure of about 150 g/cm².

The invention is now set forth in the following claims.
What is claimed is:

1. A coated article comprising:
   a) a substrate inherently having oxide and/or hydroxyl groups on the substrate surface or which form such groups by exposure of the substrate to the environment at ambient conditions and adhered to the substrate surface
   b) an organometallic film of the structure $[M(O)_x(OH)_y(OR)_z]_n$ in which M is a metal having electrons in the f orbital or is niobium; R is an alkyl group containing from 1 to 30 carbon atoms; $x+y+z=V$, the valence of M; x is at least 1; y is at least 1; z is at least 1; $x=V-y-z$; $y=V-x-z$; $z=V-x-y$; n is greater than 2, and wherein the OH and the OR groups of the organometallic film covalently bond to the substrate surface.

2. The coated article of claim 1 in which the substrate is a polymer selected from polycarbonate, polyurethane, polyester, polyepoxides, acrylic polymers and copolymers and polysiloxanes.

3. The coated article of claim 1 in which the metal is selected from La, Hf, Ta and W.

4. The coated article of claim 1 in which the coated article is eyewear.

5. The coated article of claim 1 in which the coated article is an electrooptical article.

* * * * *